United States Patent
Waseda et al.

(10) Patent No.: US 9,057,418 B2
(45) Date of Patent: Jun. 16, 2015

(54) BALANCER SHAFT DEVICE

(75) Inventors: Yoshitaka Waseda, Greer, SC (US); Kenichi Nakaoka, Nisshin (JP); Motoichi Murakami, Gotenba (JP); Kenichi Harada, Susono (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/112,082

(22) PCT Filed: Apr. 19, 2012

(86) PCT No.: PCT/JP2012/060560
§ 371 (c)(1),
(2), (4) Date: Oct. 16, 2013

(87) PCT Pub. No.: WO2012/144552
PCT Pub. Date: Oct. 26, 2012

(65) Prior Publication Data
US 2014/0033860 A1 Feb. 6, 2014

(30) Foreign Application Priority Data

Apr. 22, 2011 (JP) ................................. 2011-095808

(51) Int. Cl.
*F16F 15/14* (2006.01)
*F02B 75/06* (2006.01)
(Continued)

(52) U.S. Cl.
CPC ........... *F16F 15/267* (2013.01); *Y10T 74/2132* (2015.01); *F16C 3/20* (2013.01); *F16C 33/588* (2013.01)

(58) Field of Classification Search
CPC ......... F16F 15/267; F16C 3/20; F16C 33/588

USPC ........................ 74/572.2, 572.21, 574.2, 603; 123/192.2; 384/280, 457, 474, 475, 384/513, 515, 548, 559–561, 564, 569, 384/570; 464/180
IPC ........................... F16C 3/04,15/00; F02B 75/06
See application file for complete search history.

(56) References Cited

U.S. PATENT DOCUMENTS

| 6,772,725 | B2 | 8/2004 | Inaba et al. | |
| 7,506,628 | B2 * | 3/2009 | Marzy et al. | ................ 123/192.2 |

(Continued)

FOREIGN PATENT DOCUMENTS

| CN | 101449081 A | 6/2009 |
| DE | 10 2008 018 545 A1 | 10/2009 |

(Continued)

OTHER PUBLICATIONS

Machine translation of JP 2009127803 A obtained on Jul. 7, 2014.*

(Continued)

*Primary Examiner* — Thomas R Hannon
*Assistant Examiner* — Adam D Rogers
(74) *Attorney, Agent, or Firm* — Oliff PLC

(57) ABSTRACT

A rolling bearing of a balancer shaft device is positioned on an imaginary circle concentric with an axis of a shaft portion of a balancer shaft as viewed in a radial cross-section, and includes a cylindrical portion which covers the shaft portion. An outer circumferential surface of the cylindrical portion defines an inner ring raceway surface of an inner ring member on which a rolling element of the rolling bearing rolls. A part of the shaft portion of the balancer shaft, at a position on which the rolling bearing is disposed, has a cutout formed at a portion which does not contribute to offsetting of rotational vibration of a crankshaft.

2 Claims, 10 Drawing Sheets

(51) Int. Cl.
*F16C 43/04* (2006.01)
*F16F 15/26* (2006.01)
*F16C 3/20* (2006.01)
*F16C 33/58* (2006.01)

(56) References Cited

U.S. PATENT DOCUMENTS

| | | | |
|---|---|---|---|
| 7,647,910 B2* | 1/2010 | Solfrank | 123/192.2 |
| 8,157,451 B2* | 4/2012 | Solfrank et al. | 384/558 |
| 8,387,584 B2* | 3/2013 | Solfrank | 123/192.2 |
| 8,413,631 B2* | 4/2013 | Herzog et al. | 123/192.2 |
| 8,585,299 B2* | 11/2013 | Hess et al. | 384/565 |
| 8,757,888 B2* | 6/2014 | Flender et al. | 384/560 |
| 2003/0075136 A1 | 4/2003 | Inaba et al. | |
| 2009/0257702 A1 | 10/2009 | Solfrank | |
| 2009/0308343 A1 | 12/2009 | Herzog et al. | |
| 2012/0125281 A1 | 5/2012 | Herzog et al. | |
| 2013/0042990 A1 | 2/2013 | Solfrank | |
| 2014/0311280 A1* | 10/2014 | Solfrank et al. | 74/572.2 |

FOREIGN PATENT DOCUMENTS

| | | | |
|---|---|---|---|
| JP | A 10-68445 | | 3/1998 |
| JP | A 11-37220 | | 2/1999 |
| JP | A 2002-349222 | | 12/2002 |
| JP | A 2003-130135 | | 5/2003 |
| JP | A 2008-175137 | | 7/2008 |
| JP | 2009127803 A | * | 6/2009 |
| JP | A 2010-223389 | | 10/2010 |
| WO | WO 2011/012239 A2 | | 2/2011 |
| WO | WO 2012019831 A1 | * | 2/2012 |

OTHER PUBLICATIONS

Jul. 10, 2012 Search Report issued in International Patent Application No. PCT/JP2012/060560 (with translation).

Nov. 2, 2014 Chinese Office Action issued in Chinese Patent Application No. 201280019746.6 (with English translation).

Nov. 19, 2014 European Search Report issued in European Patent Application No. 12774442.3.

* cited by examiner

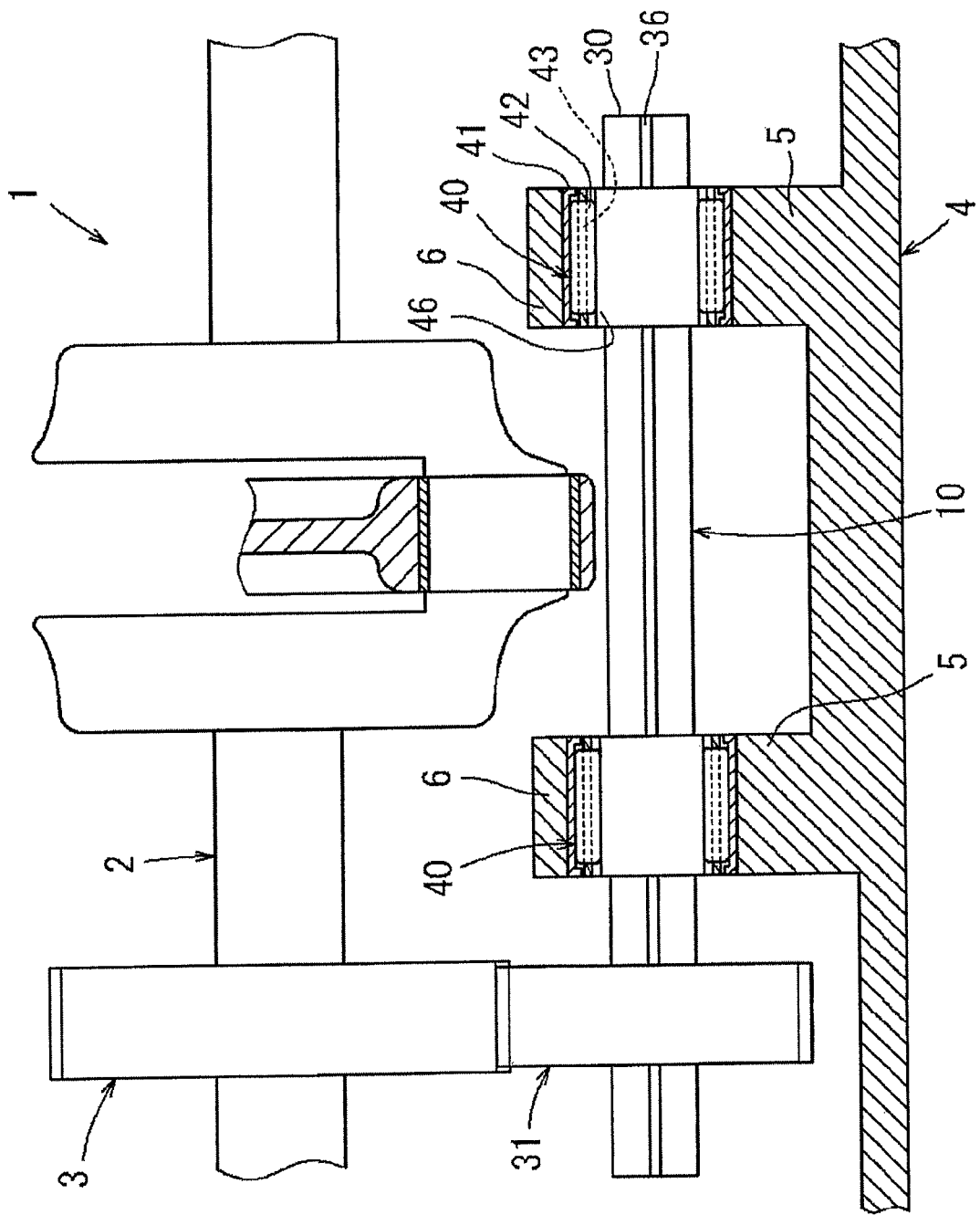

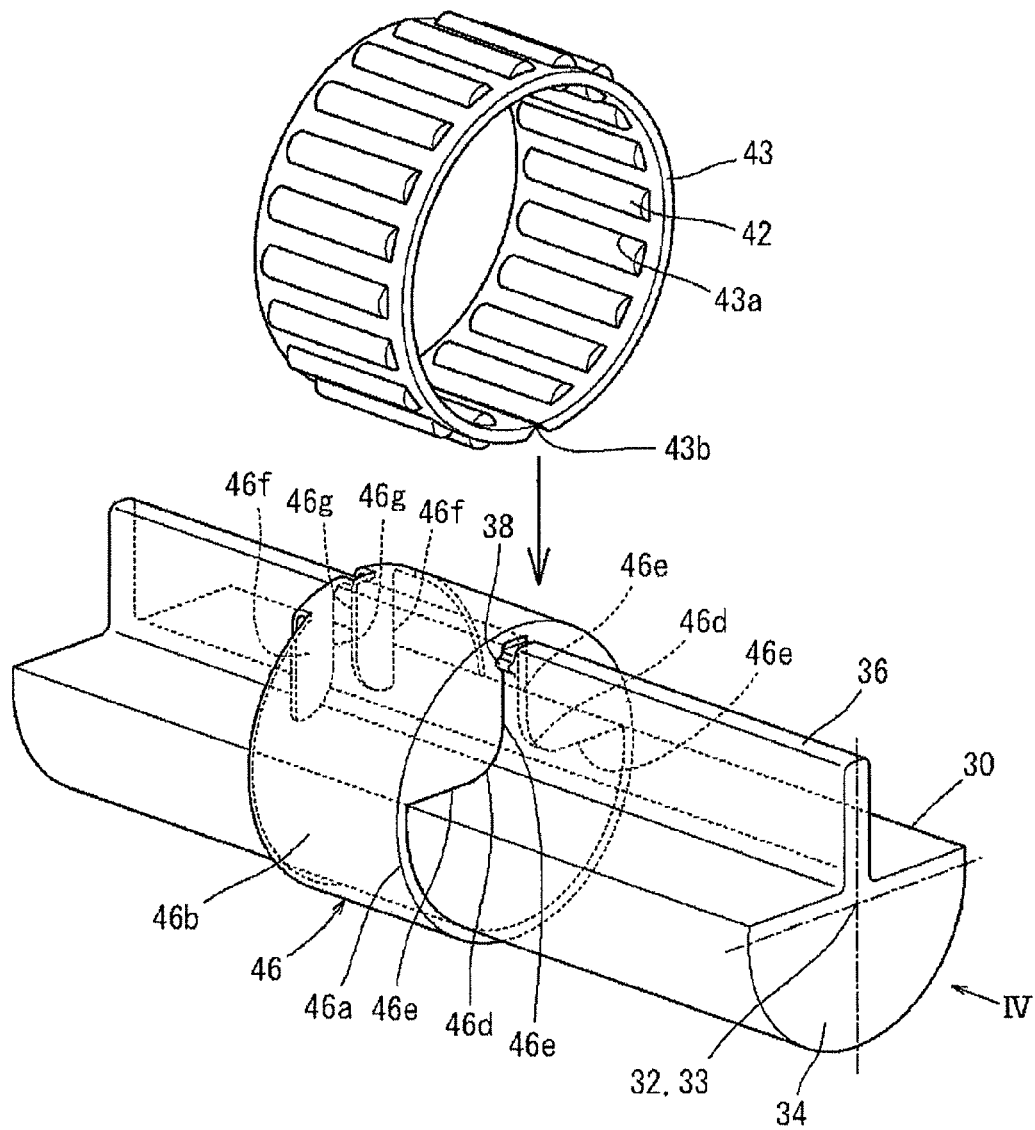

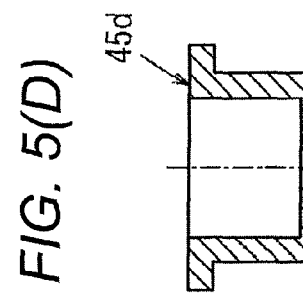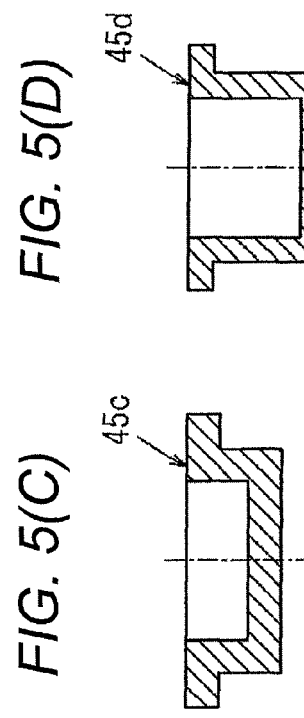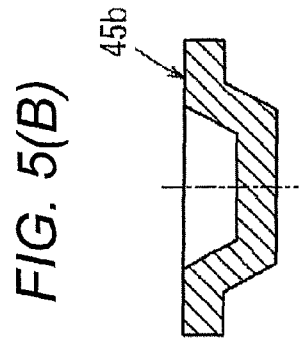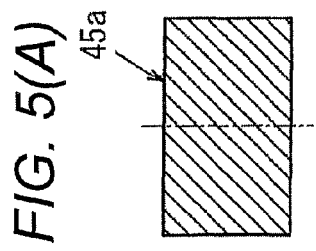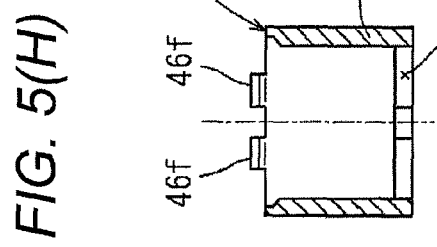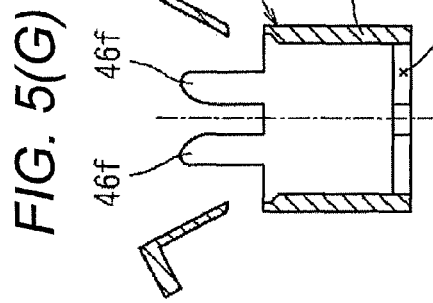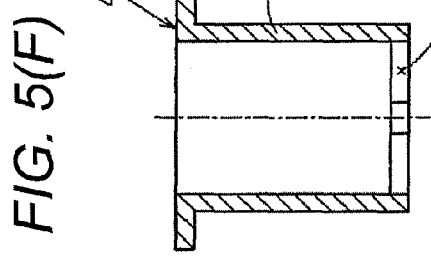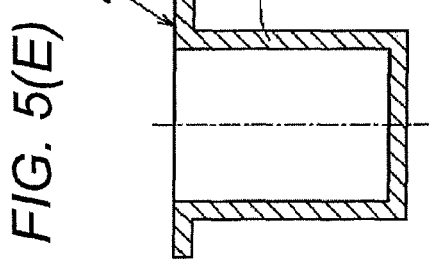

__US 9,057,418 B2__

BALANCER SHAFT DEVICE

TECHNICAL FIELD

The present invention relates to a balancer shaft device.

BACKGROUND ART

There is known a balancer shaft device which reduces rotational vibration of a crankshaft of an engine. An example of the balancer shaft device is disclosed in Patent Document 1. The balancer shaft device of Patent Document 1 includes a balancer shaft which serves to offset periodical rotational vibrations of a crankshaft of an engine, and the balancer shaft includes: a shaft portion which is disposed parallel to the crankshaft of the engine; and a balance weight (an eccentric weight portion) which is formed integrally with the shaft portion so as to be decentered from an axis of the shaft portion. The balancer shaft device further includes a rolling bearing which supports the shaft portion of the balancer shaft so as to be rotatable relative to an engine main body.

As the balance weight of the balancer shaft rotates, a centrifugal force is produced in a radial direction of the shaft portion. The centrifugal force may create a bending moment loaded on the shaft portion of the balancer shaft, which may reduce bending rigidity of the shaft portion. In order to increase the rigidity of the balancer shaft, there is known a balancer shaft device (see Patent Documents 2 to 4). The balancer shaft device includes a rib which is erected to extend, as viewed in a radial cross-section of the balancer shaft, radially outward from a portion of a shaft portion where a balance weight (an eccentric weight portion) is not disposed, i.e., from a portion of the shaft portion which does not contributed to offsetting of rotational vibration of a crankshaft (a non-eccentric weight portion).

RELATED ART DOCUMENTS

Patent Documents

Patent Document 1: JP-A-2002-349222
Patent Document 2: JP-A-2008-175137
Patent Document 3: JP-A-2003-130135
Patent Document 4: JP-A-2010-223389

SUMMARY OF THE INVENTION

Problem to be Solved by the Invention

FIG. 11 schematically shows a balancer shaft device according to Patent Documents 2 to 4. As shown in FIG. 11, a balancer shaft 630 of a balancer shaft device 610 according to Patent Documents 2 to 4 does not have a uniform cross-sectional shape. In other words, a part of a shaft portion 632 of the balancer shaft 630 located at a position for providing a rolling bearing has a cylindrical shape so as to define an inner ring raceway surface 632b on which rolling elements 642 roll. In contrast, a rib 636 is erected from a part of the shaft portion 632 other than the part thereof for providing the rolling bearing. The shape of the balancer shaft 630 results in that an extra weight is added to the portion (the non-eccentric weight portion) which does not contribute to offsetting of rotational vibration of a crankshaft (not shown). Due to the extra weight, it is necessary to add a further extra weight to a balance weight (an eccentric weight portion) 634 so as to offset the extra weight in the balancer shaft 630 itself. This results in a problem that the extra weight is added to the balancer shaft 630 as a whole. Further, since the cross-sectional shape of the balancer shaft 630 is not uniform, the shape of the balancer shaft 630 becomes complex, machining may be complex.

The invention has been made in view of the above circumstances, and an object thereof is to provide a balancer shaft device which can suppress addition of extra weight thereto.

Means for Solving the Problem

According to one aspect of the invention, there is provided a balancer shaft device including: a balancer shaft which serves to offset periodical rotational vibration of a crankshaft of an engine and which includes: a shaft portion which is disposed parallel to the crankshaft of the engine; and a balance weight which is formed integrally with the shaft portion so as to be decentered from an axis of the shaft portion; and a rolling bearing which supports the shaft portion of the balancer shaft so as to be rotatable relative to a main body of an engine, wherein the rolling bearing is positioned on an imaginary circle concentric with the axis of the shaft portion as viewed in a radial cross-section, and includes a cylindrical portion which covers the shaft portion of the balancer shaft, wherein an outer circumferential surface of the cylindrical portion defines an inner ring raceway surface of an inner ring member on which a rolling element of the rolling bearing rolls, and wherein a part of the shaft portion of the balancer shaft, at a position on which the rolling bearing is disposed, has a cutout formed at a portion which does not contribute to offsetting of the rotational vibration of the crankshaft.

Advantages of the Invention

According to the aspect of the invention, it is possible to suppress addition of extra weight to the balancer shaft device.

BRIEF DESCRIPTION OF THE DRAWINGS

FIG. 1 is an axial cross-sectional view schematically showing a state in which a balancer shaft device according to Embodiment 1 of the invention is disposed within an engine.

FIG. 2 is a perspective view showing a schematic configuration in which a rolling bearing is mounted on a balancer shaft of the balancer shaft device according to Embodiment 1 of the invention.

FIGS. 3(A) to 3(D) show an inner ring member which configures the balancer shaft device according to Embodiment 1 of the invention, in which FIG. 3(A) is an overall perspective view of the inner ring member, FIG. 3(B) is a view of the inner ring member as viewed from a direction B in FIG. 3(A), FIG. 3(C) is a view of the inner ring member as viewed from a direction C in FIG. 3(A), and FIG. 3(D) is a cross-sectional view taken along the line D-D in FIG. 3(A).

FIGS. 5(A) to 5(H) are step diagrams showing changes in shape of a material of the inner ring member of the balancer shaft device according to Embodiment 1 in respective draw forming steps of an inner ring member from a circular disk-shaped material to a final inner ring member, in which FIG. 5(A) is a step diagram showing the circular disk-shaped material, FIG. 5(B) is a step diagram showing a first formed product formed by pressing, FIG. 5(C) is a step diagram showing a second formed product formed by a first drawing, FIG. 5(D) is a step diagram showing a third formed product formed by a second drawing, FIG. 5(E) is a step diagram showing a fourth formed product formed by a third drawing, FIG. 5(F) is a step diagram showing a fifth formed product in which a hole is formed in a bottom portion thereof by a punching, FIG. 5(G) is a step diagram showing a sixth formed product in which unnecessary portions are trimmed off by inside-diameter step forming pressing, and FIG. 5(H) is a step diagram showing an inner ring member completed through bending.

FIGS. 6(A) to 6(H) are perspective views which show changes in shape of a material of the inner ring member of the balancer shaft device according to Embodiment 1 in respective draw forming steps of an inner ring member from a circular disk-shaped material to a final inner ring member, in which FIG. 6(A) is a step diagram showing the circular disk-shaped material, FIG. 6(B) is a step diagram showing a first formed product formed by pressing, FIG. 6(C) is a step diagram showing a second formed product formed by a first drawing, FIG. 6(D) is a step diagram showing a third formed product formed by a second drawing, FIG. 6(E) is a step diagram showing a fourth formed product formed by a third drawing, FIG. 6(F) is a step diagram showing a fifth formed product in which a hole is formed in a bottom portion thereof by a punching, FIG. 6(G) is a step diagram showing a sixth formed product in which unnecessary portions are trimmed off by inside-diameter step forming pressing, and FIG. 6(H) is a step diagram showing an inner ring member completed through bending.

FIGS. 7(A) to 7(C) show an inner ring member according to Embodiment 2 of the invention, in which FIG. 7(A) is an overall perspective view of the inner ring member, FIG. 7(B) is a view of the inner ring member as viewed in a direction B in FIG. 7(A), and FIG. 7(C) is a cross-sectional view taken along the line C-C in FIG. 7(A).

FIGS. 8(A) to 8(D) show an inner ring member according to Embodiment 3 of the invention, in which FIG. 8(A) is an overall perspective view of the inner ring member, FIG. 8(B) is a view of the inner ring member as viewed in a direction B in FIG. 8(A), and FIG. 8(C) is a view of the inner ring member as viewed in a direction C in FIG. 8(A), and FIG. 8(D) is a cross-sectional view taken along the line D-D in FIG. 8(A).

MODE FOR CARRYING OUT THE INVENTION

Figure 3A:
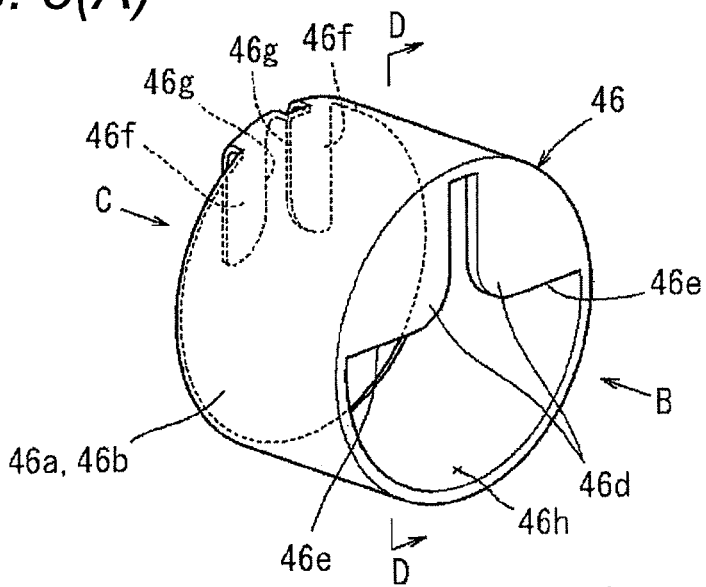

A mode for carrying out the invention will be described based on embodiments of the invention.

Embodiment 1

Embodiment 1 of the invention will be described based on FIGS. 1 to 6. Here, in the drawings illustrating the invention, for the sake of facilitating the understanding of the details of the configuration, configurations which do not affect the invention are shown in an exemplary fashion in which the detailed illustration of the related constructions is omitted. Additionally, the description of the related portions will also be omitted from time to time. As shown in FIG. 1, in order to suppress the rotational vibration of an engine 1, a balancer shaft device 10, which rotates in such a cycle that offsets the periodical rotation of a crankshaft 2 as crankshaft 2 rotates, is rotatably supported at shaft supporting portions 5 of a housing 4.

This balancer shaft device 10 includes a balancer shaft 30 and a rolling bearing 40. Here, in order to suppress the rotational vibration of the engine 1 the balancer shaft 30 rotates in such a cycle that offsets the periodical rotation of the crankshaft 2 as the crankshaft 2 rotates. Additionally, the rolling bearing 40 rotatably supports a shaft portion 32 of the balancer shaft 30 on the housing 4 of a main body of the engine 1. The configurations of the balancer shaft 30 and the rolling bearing 40 will be described below.

Firstly, the balancer shaft 30 will be described.

As shown in FIG. 2, the balancer shaft 30 has the shaft portion 32 which is disposed parallel to the crankshaft 2 of the engine 1 (refer to FIG. 1) and a balance weight 34 which is disposed in a position which is offset from an axis 33 of the shaft portion 32 which are formed integrally with the shaft portion 32. Here, the balance weight 34 has a substantially semi-circular shape in a radial cross-section. To describe this in detail, the axis 33 of the balancer shaft 30 is involved within the substantially semi-circular shape, and the shaft portion 32 and the balance weight 34 are integrated into the substantially semi-circular shape. In addition to this configuration, the balancer shaft 30 may adopt a configuration in which a shaft portion 32 having a predetermined diameter is formed (in such a state that the shape of the shaft portion 32 is also partially exposed), and a balance weight 34 is formed integrally on the shaft portion 32 in such a position that is offset from an axis 33 of the balancer shaft 30. Further, a rib 36 is erected on the balancer shaft 30 in such a way as to extend radially outward from the axis 33 or in an opposite direction to the position where the balance weight 34 is formed. This rib 36 is formed uniformly along an axial direction. This rib 36 is intended to increase the bending rigidity of the balancer shaft 30. It is noted that when the balancer shaft 30 has a sufficient bending rigidity, the rib 36 may not be provided. As viewed in a radial cross-section of the balancer shaft 30 which is configured in this way, a side of the balancer shaft 30 where the rib 36 is formed is cut out, and hence, the balancer shaft 30 has a non-circular shape which is uniform along the axial direction. Here, the side of the balancer shaft 30 where the rib 36 is formed corresponds to a "portion which does not contribute to the offsetting of the rotational vibration of the crankshaft" according to the invention. Further, the portion where the balance weight 34 is disposed corresponds to a "portion which contributes to the offsetting of the rotational vibration of the crankshaft". In addition, as shown in FIG. 1, a driven gear 31, adapted to mesh with a drive gear 3 provided on the crankshaft 2, is disposed on the axis of the balancer shaft 30. The rolling bearing 40 is disposed on the balancer shaft 30 so as to be spaced axially apart from each other at a predetermined interval.

Next, the rolling bearing 40 will be described.

As shown in FIG. 1, the rolling bearing 40 includes an outer ring member 41, a plurality of rollers (rolling elements) 42, a cage 43 which holds these rollers (rolling elements) 42 and an inner ring member 46 which defines an inner ring raceway surface 46b (refer to FIG. 2) on which the rollers (rolling elements) 42 roll and is assembled to the balancer shaft 30. As shown in FIG. 2, the rollers 42 are cylindrical rollers. It is noted that the rollers (rolling elements) 42 may be needle rollers. The cage 43 is formed from synthetic resin and is formed into an annular shape having such a diameter as to cover an outer circumference of the inner ring raceway surface 46b of the inner ring member 46, which will be described later. A plurality of pockets 43a are formed in the cage 43 so as to be provided circumferentially at equal intervals so that the rollers (rolling elements) 42 are fitted in the pockets 43a in such a state that the rollers (rolling elements) 42 are aligned in a circumferential direction. This cage 43 is formed so as to be separated in a circumferential position, and this separable portion 43b is elastically deformed in a diametrical direction so as to be opened, whereby the cage 43 is mounted on the balancer shaft 30 from a radial direction thereof. The cage 43 may be a separable cage including a pair of cages which have a semi-circular shape in a radial cross-section. The outer ring member 41 shown in FIG. 1 is made of metal and is formed into a cylindrical shape, with an outer ring raceway surface formed on an inner circumferential surface thereof. The outer ring member 41 may be a separable outer ring member including a pair of semi-circular members which have a semi-circular shape in a radial cross-section. Additionally, in case the housing 4 of the main body of the engine 1 is made to double as an outer ring raceway surface, the rolling bearing 40 may not include the outer ring member.

Figure 3B:
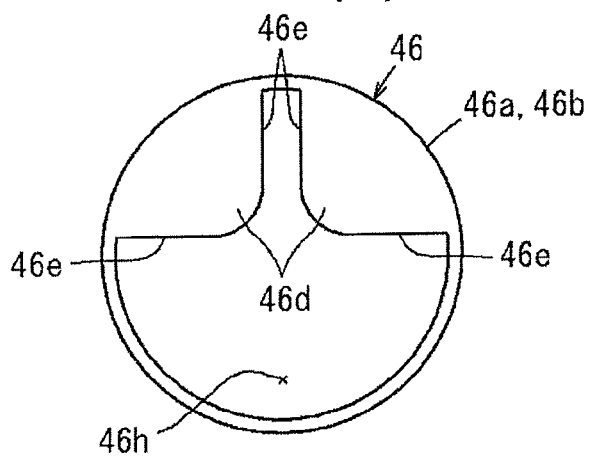
Figure 3C:
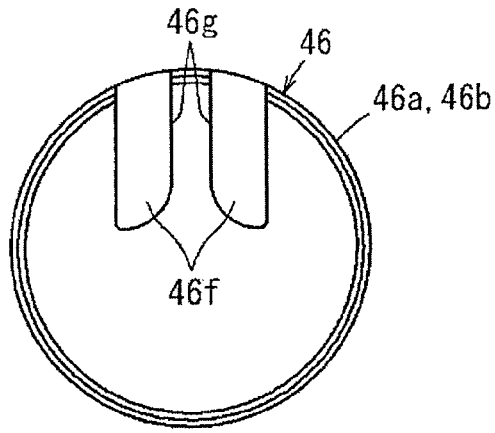
Figure 3D:
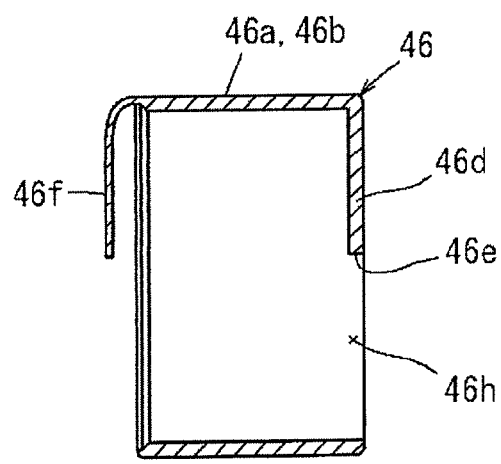

The inner ring member 46 will be described. As shown in FIGS. 2 and 3(A) to 3(D), the inner ring member 46 is positioned on an imaginary circle which is concentric with the axis 33 of the shaft portion 32 of the balancer shaft 30 as viewed in a radial cross-section thereof, and includes a cylindrical portion 46a which covers the shaft portion 32 and the balance weight 34 of the balancer shaft 30. An outer circumferential surface of this cylindrical portion 46a is made to function as the inner ring raceway surface 46b on which the rollers (rolling elements) 42 of the rolling bearing 40 roll. In addition, axial ends of the inner ring member 46 extend radially inward from the cylindrical portion 46a so as to form collar portions (a first collar portion 46d and a second collar portion 46f) which is brought into abutment with an outer circumferential portion of the balancer shaft 30. Here, as shown in FIGS. 2 and 3(B), an end portion 46e of the first collar portion 46d at one of the axial ends of the inner ring member 46 is formed into a shape which enables the end portion 46e is brought into abutment with both the rib 36 and the balance weight 34 of the balancer shaft 30. By adopting this configuration, an opening portion 46h which has substantially the same shape as the contour of the radial cross-section of the balancer shaft 30 is formed in the one axial end of the inner ring member 46. Additionally, as shown in FIGS. 2 and 3(C), the second collar portion 46f is formed at the other axial end of the inner ring member 46, which is opposite to the one axial end (the axial end where the first collar portion 46d is formed). An end portion 46g of the second collar portion 46f is brought into abutment with the rib 36 while holding it therebetween and is formed into two strip-like pieces which extend radially inward to be located near the balance weight 34.

This inner ring member 46 is fabricated as will be described below.

FIGS. 5 and 6 show changes in shape of a material of the inner ring member 46 (refer to FIG. 3) of the balancer shaft device 10 in respective draw forming steps of an inner ring member 46 from a circular disk-shaped material 45a to a final inner ring member 46. It is noted that FIGS. 5(A) to 5(H) correspond individually to FIGS. 6(A) to 6(H). As shown in FIGS. 5(A) and 6(A), firstly, a strip-like material is cut to form a circular disk-shaped material 45a. The inner ring member 46 (refer to FIG. 3) is formed by performing pressing and drawing repeatedly on this circular disk-shaped material 45a. As shown in FIGS. 5(B) and 6(B), rough pressing is applied to the circular disk-shaped material 45a to form a first formed product 45b having a recess as of a dish plate. Following this, as shown in FIGS. 5(C) and 6(C), a first drawing is performed on the first formed product 45b to thereby form a second formed product 45c whose inner circumferential surface is formed into a cylindrical shape. Next, as shown in FIGS. 5(D) and 6(D), a second drawing is performed further on the second formed product 45c to thereby form a third formed product 45d in which the depth of the cylinder is increased. Following this, as shown in FIGS. 5(E) and 6(E), a third drawing is performed further on the third formed product 45d to thereby form a fourth formed product 45e. By repeating the drawing in this way, a cylindrical portion 46a of the inner ring member 46 is formed. Next, as shown in FIGS. 5(F) and 6(F), punching is performed on the fourth formed product 45e so as to make a hole in a bottom portion thereof to thereby form a fifth formed product 45f. It is noted that by performing the punching in the way described above, an opening portion 46h (refer to FIG. 3(B)) through which the balancer shaft 30 is allowed to pass is formed to thereby form a first collar 46d. Next, as shown in FIGS. 5(G) and 6(G), a sixth formed product 45g in which unnecessary portions are trimmed off is formed through inside-diameter forming pressing. A second collar portion 46f is formed which has strip-like pieces through this inside-diameter step forming pressing. Finally, as shown in FIGS. 5(H) and 6(H), the strip-like pieces of the sixth formed product 45g are roll bent and pressed to thereby form the second collar portion 46f, whereby the inner ring member 46 is completed. It is noted that a further step may be added in which a heat treatment is applied to the inner ring member 46 alone to increase the hardness of the inner ring raceway surface 46b. In addition, polishing may be applied to the cylindrical portion 46a of the inner ring member 46 so that the cylindrical portion 46a is formed into the inner ring raceway surface 46b. By repeating the drawing in this way, the cylindrical inner ring member 46 is formed. In the process of forming the inner ring member 46 described above, while the inner ring member 46 is described as being formed through three drawings, no specific limitation is imposed on the number of times of drawing, and hence, the pressing and drawing steps are repeated as required depending upon the shape and size of a required inner ring member 46.

Next, the mounting of the rolling bearing 40 on the balancer shaft 30 will be described.

Figure 4:
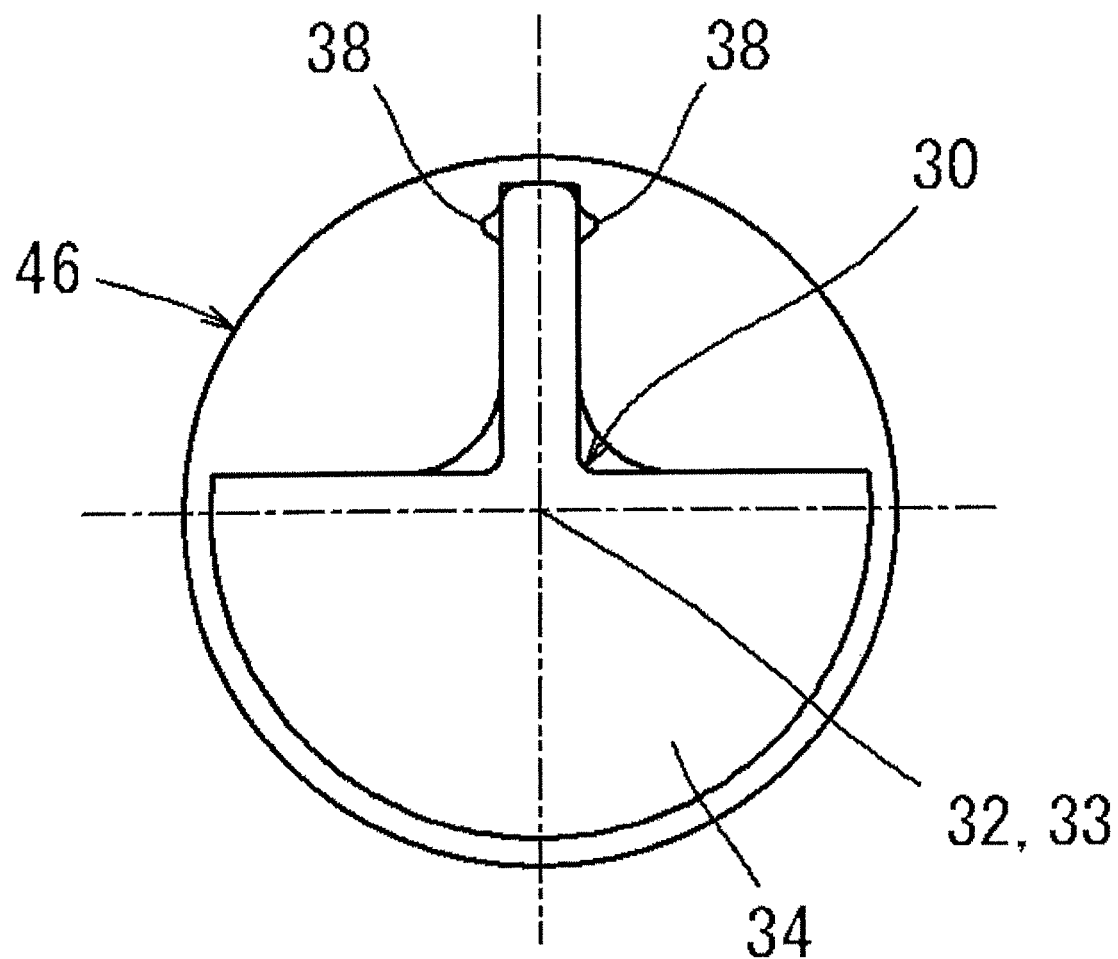
FIG. 4 is a view of the inner ring member as viewed from a direction IV in FIG. 2.
Figure 6A:
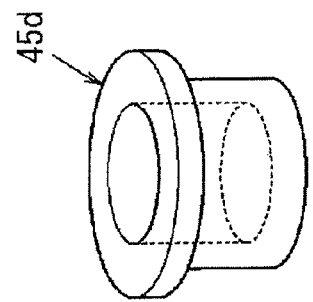
Figure 6B:
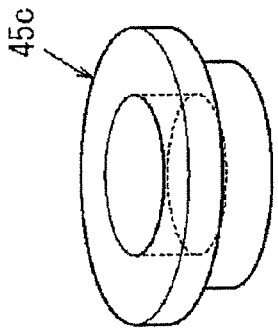
Figure 6C:
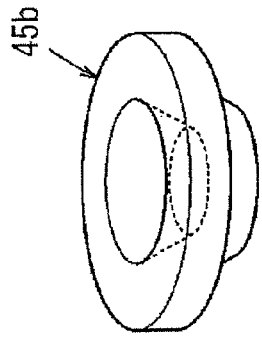
Figure 6D:
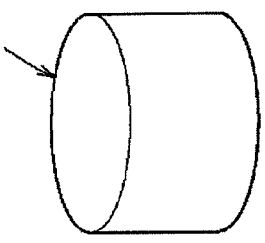
Figure 6E:
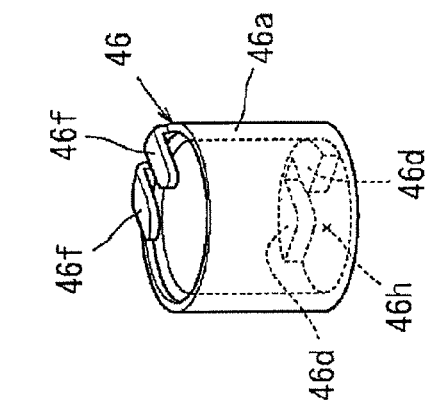
Figure 6F:
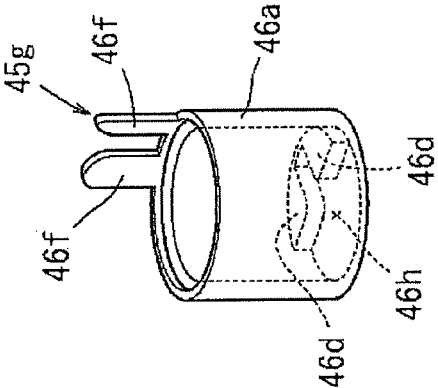
Figure 6G:
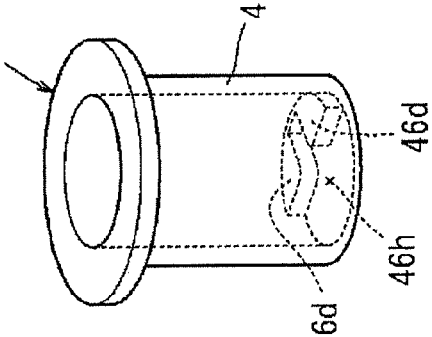
Figure 6H:
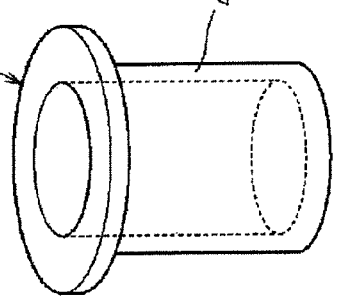

As shown in FIG. 2, firstly, the inner ring member 46 is slid on to the balancer shaft 30 from an end portion which is opposite to an end portion where the driven gear 31 (refer to FIG. 1) is disposed and is moved to a position where to dispose the rolling bearing 40. Then, as shown in FIGS. 2 and 4, portions of the rib 36 of the balancer shaft 30 which lie at both ends of the cylindrical portion 46a of the inner ring member 46 are plastically deformed with a tool having a flat blade-like shape (not shown) so as to form crimped portion 38. Axial movements of the inner ring member 46 are restrained by the crimped portions 38 so formed. After that, as shown in FIG. 2, the cage 43 in which the rollers (rolling elements) 42 are fitted is mounted on the inner ring raceway surface 46b of the inner ring member 46. Then, the outer ring member 41 (refer to FIG. 1) is mounted. In this way, the rolling bearing 40 is mounted on the balancer shaft 30, completing the balancer shaft device 10. As shown in FIG. 1, the shaft supporting portions 5 are provided on the housing 4 so as to be spaced a predetermined distance apart from each other in the axial direction. A semi-arc-shaped recess portion is formed in an upper surface of each of these shaft supporting portions 5. Then, the balancer shaft device 10 on which the rolling bearing 40 is mounted is placed in the respective recess portions of the shaft supporting portions 5. Then, cover members 6 are placed on the recess portions of the shaft supporting portions 5 so as to cover the rolling bearing 40, whereafter the covers 6 are fastened with bolts. In this way, the balancer shaft device 10 is assembled in the inside of the housing 4 of the main body of the engine 1.

The balancer shaft device 10, which is configured in the way described above, includes the inner ring member 46 which defines the inner ring raceway surface 46b on which the rollers (rolling elements) 42 roll. The inner ring member 46 is positioned on the imaginary circle which is concentric with the axis 33 of the shaft portion 32 of the balancer shaft 30 as viewed in a radial-cross section thereof, and includes the cylindrical portion 46a which covers the shaft portion 32 of the balancer shaft 30. The outer circumferential surface of this cylindrical portion 46a is configured as the inner ring raceway surface 46b. In the positions of the shaft portion 32 of the balancer shaft 30 where the rolling bearing 40 is disposed, the portions which do not contribute to the offsetting of rotational vibration of the crankshaft 2 are configured as cutouts. Namely, the rolling bearing 40 is formed by disposing the cylindrical inner ring members 46 on the non-circular shaft portion 32 of the balancer shaft 30. Here, a hollow space is defined between the portion of the shaft portion 32 of the balancer shaft 30 which lies in the position where the rolling bearing 40 is disposed and which does not contribute to the offsetting of rotational vibration of the crankshaft 2 and the inner ring member 46. Although the rolls (rolling elements) 42 of the rolling bearing 40 roll in the hollow space portion, the hollow space portion constitutes a portion which is not affected by centrifugal force produced by the rotation of the balancer shaft 30. Namely, the portion where the centrifugal force is to be applied while the balancer shaft 30 is rotating is the portion which contributes to the offsetting of rotational vibration of the crankshaft 2 (the portion where the balancer shaft 30 is provided to be brought into abutment with the inner ring member 46). Although the hollow portion exists on a radially inner side of the inner ring member 46, the rolling of the rollers (rolling elements) 42 is not affected by the hollow portion. By adopting this configuration, even in the configuration in which the shaft portion 32 of the balancer shaft 30 has no cylindrical shape, the rolling bearing 40 can be provided. Because of this, the balancer shaft device 10 can be provided which suppresses an extra weight increase. Additionally, the balancer shaft 30 is allowed to have the shape which is uniform along the axial direction, thereby facilitating the machining of the balancer shaft 30.

In addition, the end portion 46e of the first collar portion and the end portion 46g of the second collar portion are in abutment with the outer circumferential portion of the balancer shaft 30, whereby the end portions work not only to prevent the rotation of the inner ring member 46 but also to increase the rigidity of the inner ring member 46.

Embodiment 2

Figure 7A:
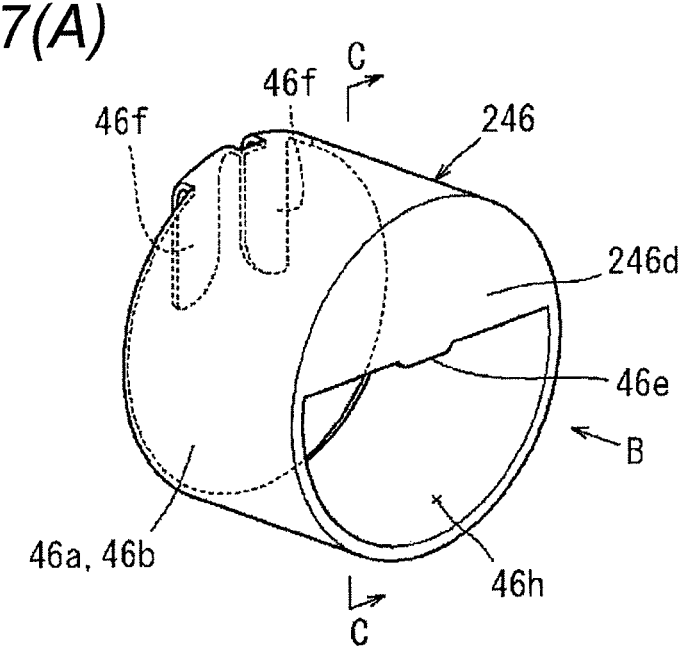
Figure 7B:
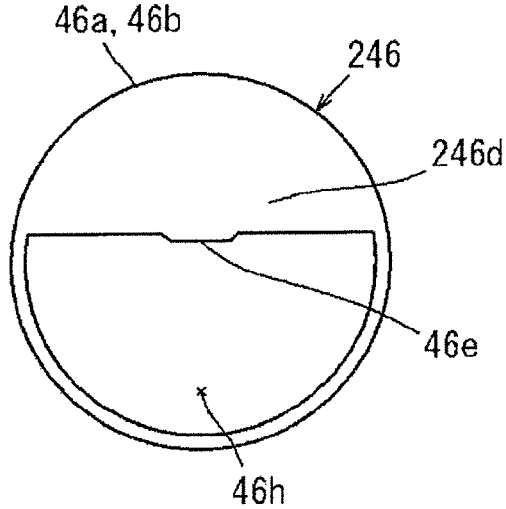
Figure 7C:
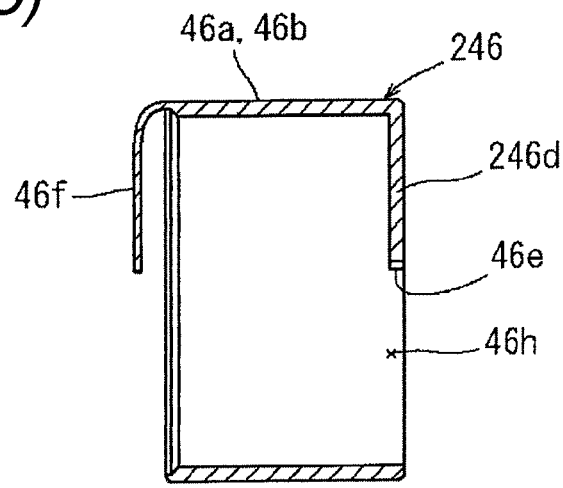
Figure 8A:
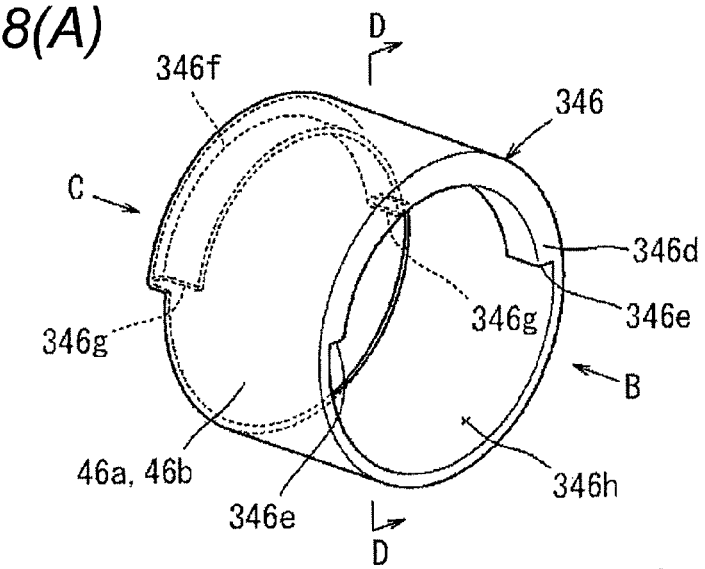
Figure 8B:
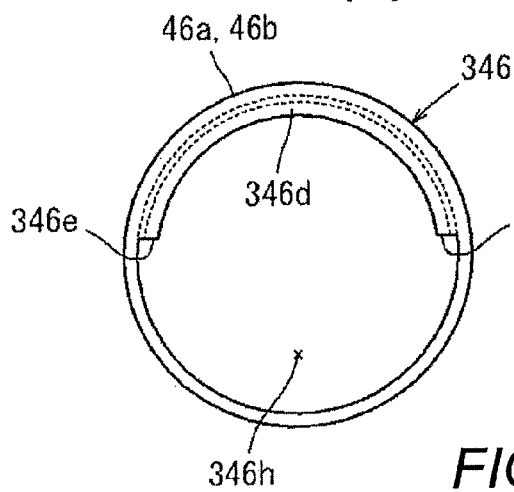
Figure 8C:
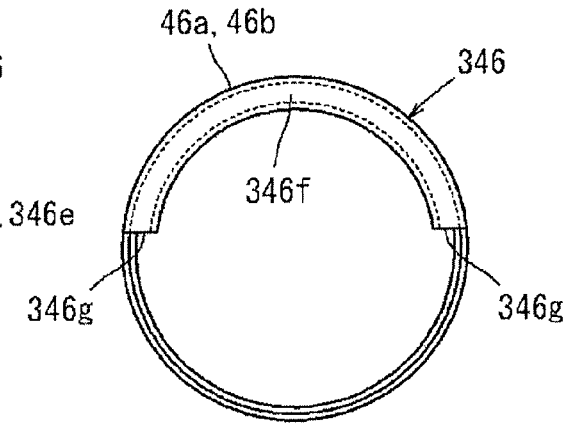
Figure 8D:
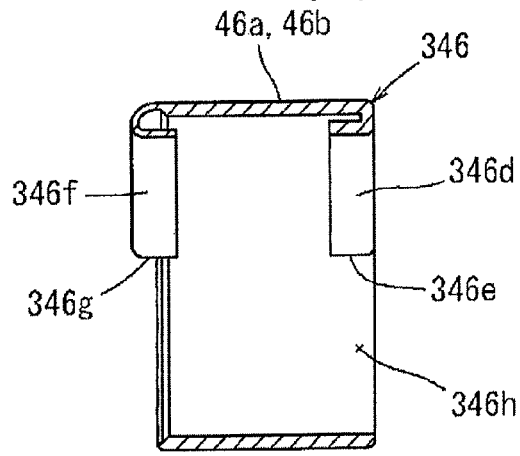

Next, Embodiment 2 of the invention will be described based on FIGS. 7(A) to 7(C).

It is described before that in Embodiment 1, when good bending rigidity margins are given to the balancer shaft 30, no rib 36 may be provided on the balancer shaft 30. Here, an inner ring member 246 according to Embodiment 2 is shown in FIGS. 7(A) to (C). In order for the inner ring member 246 to be applied to a balancer shaft 30 having no rib 36 formed thereon, a first collar portion 246d of the inner ring member 246 may be formed into a semi-circular shape. Since the other configurations of Embodiment 2 are the same as those of Embodiment 1, like reference numerals will be given to like constituent portions, and the description thereof will be omitted here. In Embodiment 2 which is configured in this way, the same working effect as that of Embodiment 1 may be obtained.

Embodiment 3

Next, Embodiment 3 of the invention will be described based on FIGS. 8(A) to 8(D).

As shown in FIGS. 8(A) to 8(D), as an inner ring member which is applied to a balancer shaft 30 having no rib 36 formed thereon, an inner ring member 346 includes a first collar portion 346d and a second collar portion 346f. The first collar portion 346d and the second collar portion 346f are folded back toward an inner circumferential surface at a portion of a cylindrical portion 46a where no balance weight 34 is provided in such a way as to border the cylindrical portion 46a. Then, circumferential ends of the first collar portion 346d and the second collar portion 346f are configured as end portions 346e of the first collar portion and end portions 346g of the second collar portion which are brought into abutment with a balance weight 34 (refer to FIG. 2). As a result of the first collar portion 346d and the second collar portion 346f being configured in the way described above, an opening portion 346h through which the balancer shaft 30 is allowed to pass has an opening which is larger than the contour of a radial cross-section of the balancer shaft 30. The other configurations of Embodiment 3 are the same as those of Embodiment 1, and therefore, like reference numerals will be given to like constituent portions, the description thereof being thereby omitted here. In Embodiment 3 which is configured in this way, the same working effect as that of Embodiment 1 may be obtained. In addition, the first collar portion 346d and the second collar portion 346f can be made smaller than the corresponding counterparts of Embodiment 1, and therefore, the inner ring member can be made much lighter in weight than that of Embodiment 1.

Embodiment 4

Next, Embodiment 4 of the invention will be described based on FIG. 9.

Figure 9:
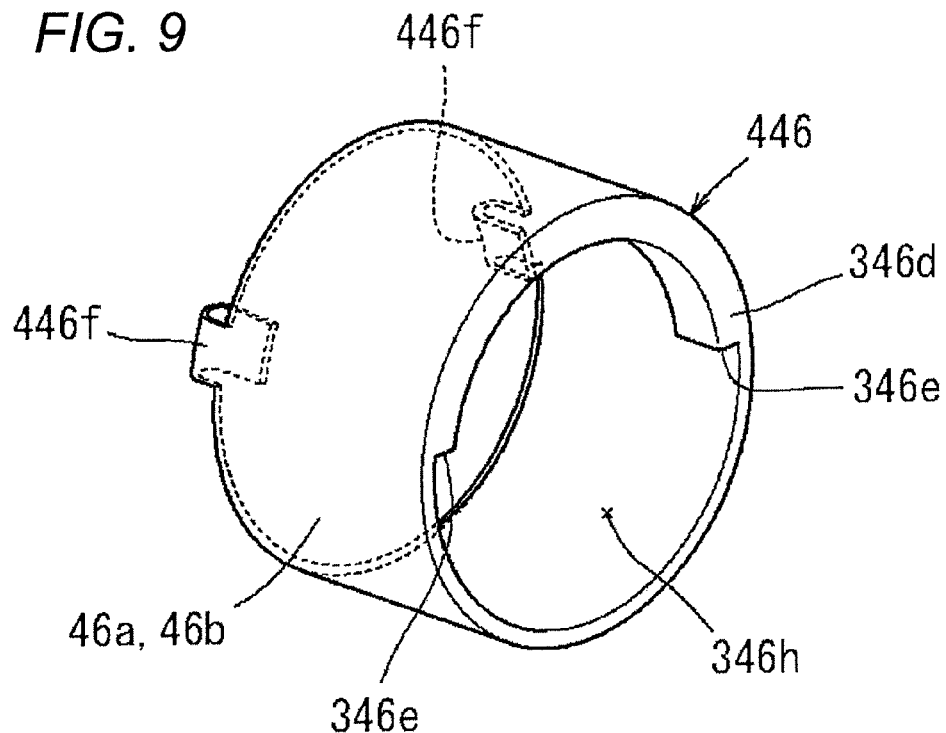
FIG. 9 is an overall perspective view of an inner ring member according to Embodiment 4 of the invention.

FIG. 9 shows an inner ring member 446 according to Embodiment 4. Here, in the example according to Embodiment 4, the inner ring member 446 results from the inner ring member 346 shown in Embodiment 3 being modified partially.

As shown in FIG. 9, a portion of a second collar portion 446f of the inner ring member 446 which is not brought into abutment with a balance weight 34 (refer to FIG. 2) is omitted. The other configurations of Embodiment 4 are the same as those of Embodiment 3, like reference numerals will be given to like constituent portions, the description thereof being thereby omitted here. In Embodiment 4 which is configured in this way, not only can the same working effect as that obtained in Embodiment 3 be obtained, but also the second collar portion 446f can be formed smaller than the counterparts in Embodiments 1 and 3. Because of this, the inner ring member 346 can be formed far lighter in weight than those of Embodiments 1 and 3. It is noted that the first collar portion 446d may have a configuration as that of the second collar portion 446f.

Embodiment 5

Next, Embodiment 5 of the invention will be described based on FIG. 10.

Figure 10:
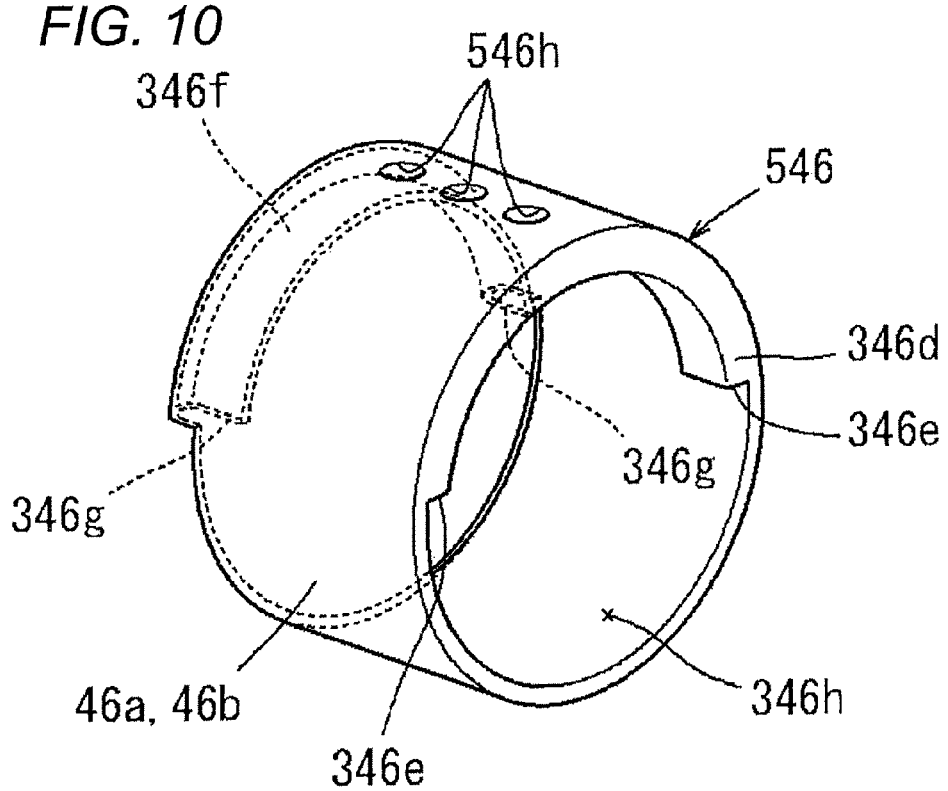
FIG. 10 is an overall perspective view of an inner ring member according to Embodiment 5 of the invention.
Figure 11:
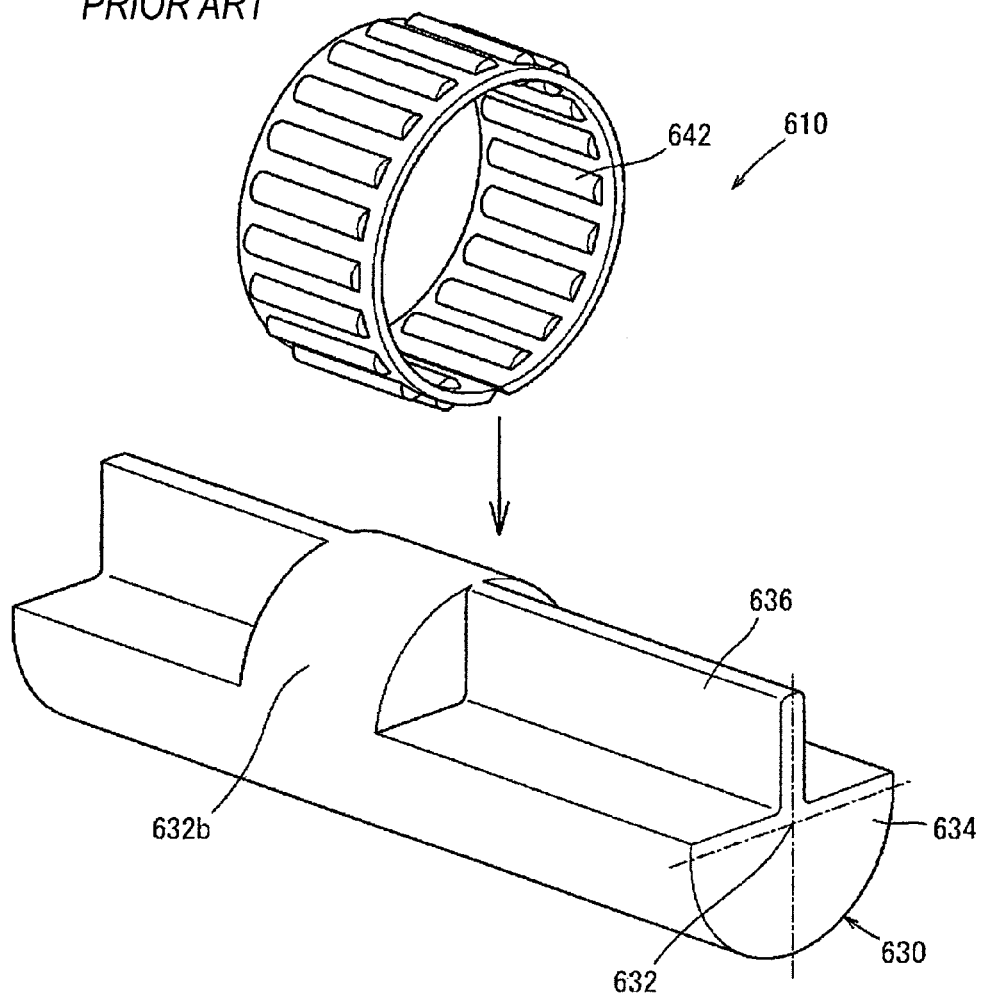
FIG. 11 is a perspective view showing a schematic configuration in which a rolling bearing is mounted on a balancer shaft of a related-art balancer shaft device.

FIG. 10 shows an inner ring member 546 according to Embodiment 5. Here, in the example according to Embodiment 5, the inner ring member 546 results from the inner ring member 346 shown in Embodiment 3 being modified partially.

As shown in FIG. 10, as viewed in a radial cross-section of the inner ring member 546, oil discharge holes (hole portions) 546h are formed to radially penetrate a cylindrical portion 46a at a portion which corresponds to a cutout portion lying opposite to a position where a balance weight 34 of a balancer shaft 30 is disposed. The other configurations of Embodiment 5 are the same as those of Embodiment 3, and therefore, like reference numerals will be given to like constituent portions, the description thereof being thereby omitted here. In Embodiment 5 which is configured in the way described above, the same working effect as that obtained in Embodiment 3 can be obtained. In addition, oil in the form of mist fills the inside of a main body of an engine 1, and oil also stays on a radially inner side of the inner ring member 546 of a balancer shaft device of this embodiment. Here, the oil staying on the radially inner side of the inner ring member 546 is caused to adhere to an inner circumferential surface of a cylindrical portion 46a by virtue of the action of centrifugal force produced in association with the rotation of the balancer shaft 30. Here, since the oil discharge holes (hole portions) 546h are formed in the inner ring member 546, the oil can be supplied to the rolling elements side through these oil discharge holes (hole portions) 546h. A function as a so-called oil separator can be obtained. The shape of the first collar portion 346d and the second collar portion 346f in Embodiment 3 is applied to the shape of collar portions of the inner ring member 546. However, the example of the inner ring member 546 of Embodiment 5 can also be applied to the first collar portion 46d and the second collar portion 46f of Embodiment 1.

Thus, according to the embodiments of the invention, the balancer shaft device can be provided in the following aspects.

In a first aspect, there is provided a balancer shaft device including: a balancer shaft which serves to offset periodical rotational vibration of a crankshaft of an engine and which includes: a shaft portion which is disposed parallel to the crankshaft of the engine; and a balance weight which is formed integrally with the shaft portion so as to be decentered from an axis of the shaft portion; and a rolling bearing which supports the shaft portion of the balancer shaft so as to be rotatable relative to a main body of an engine, wherein the rolling bearing is positioned on an imaginary circle concentric with the axis of the shaft portion as viewed in a radial cross-section, and includes a cylindrical portion which covers the shaft portion of the balancer shaft, wherein an outer circumferential surface of the cylindrical portion defines an inner ring raceway surface of an inner ring member on which a rolling element of the rolling bearing rolls, and wherein a part of the shaft portion of the balancer shaft, at a position on which the rolling bearing is disposed, has a cutout formed at a portion which does not contribute to offsetting of the rotational vibration of the crankshaft.

According to the first aspect, the rolling bearing provided on the balancer shaft device includes the inner ring member which defines the inner ring raceway surface on which the rolling elements roll. The inner ring member is positioned on the imaginary circle concentric with the axis of the shaft portion of the balancer shaft as viewed in a radial cross-section, and includes the cylindrical portion which covers the shaft portion of the balancer shaft. In a part of the shaft portion of the balancer shaft, at the position on which the rolling bearing is disposed, the portion which does not contribute to the offsetting of rotational vibration of the crankshaft is formed as the cutout. In other words, the rolling bearing is formed by disposing the cylindrical inner ring member on the non-circular shaft portion of the balancer shaft. Here, the hollow space is defined between the part of the shaft portion of the balancer shaft which is at the position on which the rolling bearing is disposed and which does not contribute to the offsetting of rotational vibration of the crankshaft and the inner ring member. Although the rolling element of the rolling bearing rolls in the hollow space portion, the hollow space portion constitutes a portion which is not affected by centrifugal force produced by the rotation of the balancer shaft. Namely, the portion where the centrifugal force is to be applied while the balancer shaft is rotating is the portion which contributes to the offsetting of rotational vibration of the crankshaft (the portion where the balancer shaft is provided to be brought into abutment with the inner ring member). Although the hollow portion exists on the radially inner side of the inner ring member, the rolling of the rolling elements is not affected by the hollow portion. By adopting this configuration, even in the configuration in which the shaft portion of the balancer shaft has no cylindrical shape, the rolling bearing can be provided. Because of this, the balancer shaft device can be provided which suppresses the extra weight increase. Additionally, the balancer shaft is allowed to have the shape which is uniform along the axial direction, thereby facilitating the machining of the balancer shaft 30.

In a second aspect, there is provided the balancer shaft device according to the first aspect, wherein a color portion is formed, at least, at one end portion of an axial end portions of the inner ring member, and extends radially inward from the cylindrical portion so as to contact an outer circumferential portion of the balancer shaft.

According to the second aspect, the collar portion is brought into abutment with the outer circumferential portion of the balancer shaft, whereby the collar portion can function not only to prevent the rotation of the inner ring member but also to increase the rigidity of the inner ring member.

In a third aspect, there is provided the balancer shaft device according to the second aspect, wherein as viewed in a radial cross-section of the inner ring member, at least one hole portion is formed to radially penetrate the cylindrical portion at a portion corresponding to the cutout portion positioned to be opposite to a position where the balance weight of the balancer shaft is disposed.

According to the third aspect, oil in the form of mist fills the inside of the main body of the engine, and oil also stays on the radially inner side of the inner ring member of the balancer shaft device. Here, the oil staying on the radially inner side of the inner ring member is caused to adhere to the inner circumferential surface of the cylindrical portion by virtue of the action of the centrifugal force produced in association with the rotation of the balancer shaft. Here, since the radially penetrating hole is formed in the inner ring member which corresponds to the cutout portion which lies opposite to the position on the balancer shaft where the balance weight is disposed, the oil can be supplied to the rolling elements side through the hole portion. A function as a so-called oil separator can be obtained.

Thus, while the embodiments of the invention have been described based on Embodiments 1 to 5, the balancer shaft device of the invention is not limited thereto, and the invention may be carried out in other various forms.

DESCRIPTION OF REFERENCE SIGNS

1: Engine
2: Crankshaft
3: Drive Gear
4: Housing
5: Shaft Supporting Portion

6: Cover Member
10: Balancer Shaft Device
30: Balancer Shaft
31: Driven Gear
32: Shaft Portion
33: Axis
34: Balance Weight
36: Rib
38: Crimped Portion
40: Rolling Bearing
41: Outer Ring Member
42: Roller (Rolling Element)
43: Cage
43a: Pocket
43b: Separable Portion
45a: Circular Disk-Shaped Material
45b: First Formed Product
45c: Second Formed Product
45d: Third Formed Product
45e: Fourth Formed Product
45f: Fifth Formed Product
45g: Sixth Formed Product
46: Inner Ring Member
46a: Cylindrical Portion
46b: Inner Ring Raceway Surface
46c: Inner Circumferential Surface
46d: First Collar Portion
46e: End Portion of First Collar Portion
46f: Second Collar Portion
46g: End Portion of Second Collar Portion
46h: Opening Portion
246: Inner Ring Member
246d: First Collar Portion
346: Inner Ring Member
346d: First Collar Portion
346e: End Portion of First Collar Portion
346f: Second Collar Portion
346g: End Portion of Second Collar Portion
346h: Opening Portion
446: Inner Ring Member
446d: First Collar Portion
446f: Second Collar Portion
546: Inner Ring Member
546h: Oil Discharge Hole (Hole Portion)

The invention claimed is:

1. A balancer shaft device comprising:
a balancer shaft which serves to offset periodical rotational vibration of a crankshaft of an engine and which comprises:
 a shaft portion which is disposed parallel to the crankshaft of the engine; and
 a balance weight which is formed integrally with the shaft portion so as to be decentered from an axis of the shaft portion, the balance weight having a substantially semi-circular shape in a radial-cross section which is uniform along an axial direction; and
a rolling bearing which supports the shaft portion of the balancer shaft so as to be rotatable relative to a main body of the engine,
wherein a radial-cross section of the balancer shaft is uniform along the axial direction,
wherein the rolling bearing is positioned concentric with the axis of the shaft portion as viewed in a radial-cross section, and comprises a cylindrical portion which covers the shaft portion of the balancer shaft, an inner surface of the cylindrical portion has a substantially circular shape in the radial-cross section such that the cylindrical portion is slidably attached to the balancer shaft from the axial direction,
wherein an outer circumferential surface of the cylindrical portion defines an inner ring raceway surface of an inner ring member on which a rolling element of the rolling bearing rolls, and
wherein a collar portion is formed, at least, at one end portion of an axial end portion of the inner ring member, and extends radially inward from the cylindrical portion so as to contact an outer circumferential portion of the balancer shaft.

2. The balancer shaft device according to claim 1,
wherein as viewed in a radial cross-section of the inner ring member, at least one hole portion is formed to radially penetrate the cylindrical portion at a portion corresponding to a cutout portion positioned to be opposite to a position where the balance weight of the balancer shaft is disposed, the cutout portion being formed at part of the shaft portion of the balancer shaft.

\* \* \* \* \*